United States Patent [19]

Pell

[11] 4,378,378

[45] Mar. 29, 1983

[54] METHOD FOR TEXTURIZING A PROTEINACEOUS FUNGAL MASS

[75] Inventor: Albert H. Pell, Didcot, England

[73] Assignee: E. I. Du Pont de Nemours and Company, Wilmington, Del.

[21] Appl. No.: 257,971

[22] Filed: Apr. 27, 1981

Related U.S. Application Data

[63] Continuation-in-part of Ser. No. 177,187, Aug. 7, 1980, abandoned, which is a continuation of Ser. No. 694,988, Jun. 11, 9176, abandoned.

[30] Foreign Application Priority Data

Jun. 13, 1975 [GB] United Kingdom ............... 25387/75

[51] Int. Cl.$^3$ ............................................... A23J 3/00

[52] U.S. Cl. .................................. 426/104; 426/656; 426/517; 426/802

[58] Field of Search ................ 426/104, 656, 802, 517

[56] References Cited

FOREIGN PATENT DOCUMENTS 1092426 12/1980 Canada .
1502455 3/1978 United Kingdom .

Primary Examiner—Esther M. Kepplinger

[57] ABSTRACT

There is disclosed a method of texturizing at ambient temperature a mass consisting essentially of fungal mycelia and moisture comprising a combination of steps involving only rolling the mass and juxtaposing sections of said mass. There is also disclosed the meat-like or fish-like product made from the method.

9 Claims, 10 Drawing Figures

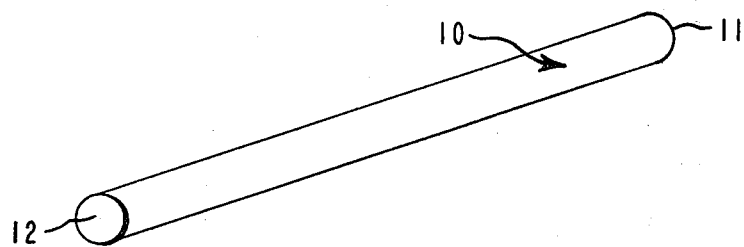
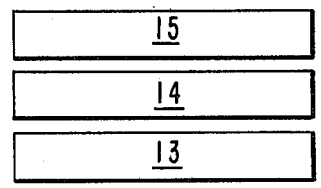
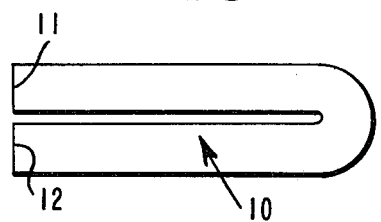
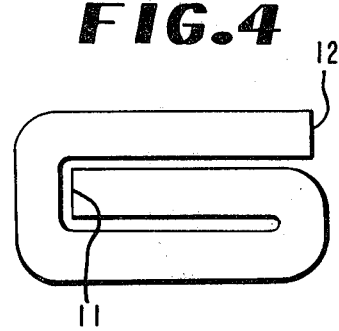
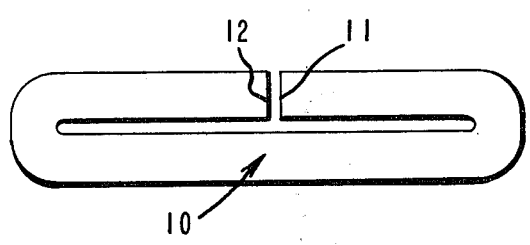

METHOD FOR TEXTURIZING A PROTEINACEOUS FUNGAL MASS

CROSS-REFERENCES TO RELATED APPLICATIONS

This application is a continuation-in-part of U.S. patent application Ser. No. 177,187, filed on Aug. 7, 1980, now abandoned, which in turn is a continuation of U.S. patent application Ser. No. 694,988, filed on June 11, 1976, now abandoned.

BACKGROUND OF THE INVENTION

This invention relates to a method for texturizing a mycelial fungal mass for use as a foodstuff.

Existing methods of working an amorphous mass of proteinaceous substance, for example, a mass derived from soya or from cereals or other vegetable sources, are well known and are employed in an attempt to provide a sufficient degree of random texturizing to make the substance readily acceptable as a foodstuff for humans.

U.S. Pat. No. 3,759,715, issued to Loepiktie et al on Sept. 18, 1973, discloses a method of producing an expanded protein food product having resiliency, chewiness and mouthfeel characteristics of real meat comprising the sequential steps of forming a dough of a secondary protein source material (vegetable protein) and an aqueous liquid; confining the dough so that a major portion of the surface of the dough is confined and a smaller portion of the surface of the dough is unconfined; exposing the partially confined dough to a heated atmosphere at a pressure between about 80 and 120 psi; and releasing the pressure to cause the partially confined dough to expand in the direction of the unconfined portion of the dough and form an expanded food product.

U.S. Pat. No. 3,814,823, issued to Yang et al on June 4, 1974, discloses a process for forming a meat-like, protein-containing product having unidirectional parallel fiber structure similar to that of natural meat fiber structure. The process comprises forming a protein mix containing from 30–100% by weight of a heat coagulable protein; adjusting the moisture content of the protein mix to form a wet mix having a moisture content within the range of from 20%–80% by weight of the wet mix; mixing the wet mix to provide a coherent workable protein dough; and thereafter subjecting the coherent workable protein dough to nonturbulent stretching and heat at a temperature above the heat-coagulation temperature of the heat-coagulable protein to provide a unidirectional, parallel, meat-like fiber structure. Vegetable or animal protein are disclosed as being useful as the heat-coagulable protein.

Mycelial fungi grown under controlled conditions in a fermenter are also a source of protein and it is to the texturizing of mycelial fungi with the particular aim of simulating meat that the present invention is concerned. A mycelial fungal mass is anisotropic in that manipulation of the mass will result in an irregular structure being imparted to the mass. A mycelial fungal mass is made up of groups of hyphae in random order and so as to make the mass acceptable as a foodstuff for humans the mass must be given a texture, preferably resembling the texture of a known foodstuff, for example, meat. In resembling meat the mass must have, inter alia, the layered and fibrous appearance of meat and also the chewiness of meat.

It is the main object of this invention to provide a method for texturizing a mycelial fungal mass so as to give to the mass a texture which is analogous to the texture of meat or fish.

U.S. Pat. No. 3,939,284, issued to Akin et al on Feb. 17, 1976, discloses a process for imparting meat-like texture to mixtures of single-cell protein material combined with plant protein materials and/or animal protein materials. The process comprises passing a mixture containing about 5 to about 50% of single-cell protein through a pre-conditioning zone wherein the moisture level is adjusted to about 20–45%; extruding the moisturized protein mixture at a temperature within the range of 210°–385° F. to provide a shaped extrudate; drying the extrudate at temperatures ranging from about 130° to about 350° F.; and cooling the dried extrudate. The patent further discloses that the shaped extrudate may be pulled immediately, exposed to a friction force by passing it through differential speed rollers, or cooled, rehydrated and exposed to a friction force by passing it through differential speed rollers, prior to drying the extrudate.

Prior art processes for texturizing a protein mass generally require high-temperature treatment, elevated pressure and/or relatively involved treatment. There exists a need for alternative and less complex texturizing processes.

SUMMARY OF THE INVENTION

According to the present invention there is provided a method of texturizing at ambient temperature a mass consisting essentially of fungal mycelia and moisture, said mass having reduced turgor and a solids content of from about 20–40% by weight, comprising solely the steps of (A) rolling the mass between two mutually moving surfaces to form an elongate cylinder, (B) juxtaposing at least two sections of the cylinder to form a tiered mass, and (C) successively repeating steps (A) and (B) and finishing with step (A) to obtain a meat-like or fish-like structure. The meat-like or fish-like mass is also a part of the present invention.

BRIEF DESCRIPTION OF THE DRAWING

FIG. 1 is a diagrammatic representation of a cylinder formed of mycelial fungal mass;

FIGS. 2 to 5 inclusive illustrate ways in which the cylinder of FIG. 1 may be manipulated for further processing;

DETAILED DESCRIPTION OF THE INVENTION

Figure 6:
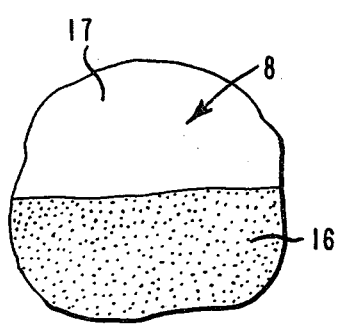
FIG. 6 is an end view of a mass of mycelial fungal material at the start of the method according to the invention.

Non-toxic fungal mycelium particularly suitable for use in the method of the invention are disclosed in United Kingdom Patent Specifications Nos. 1,331,472 and 1,346,062, the fermentation product having been reduced in turgor, suitably by a reduction in the ribonucleic acid level. It is preferable that the ribonucleic acid level be reduced about ten fold although a reduction of less than this will provide adequate loss of turgor. The reduction in the ribonucleic acid level may be achieved in accordance with the disclosures in United Kingdom Patent Specifications Nos. 1,408,845 or 1,440,642. The most significant results of the loss of ribonucleic acid for structuring purposes is the loss of turgor in the mass. Turgor is simply the normal hydraulic pressure in the cell which contains about 80% to 90% water.

It has been found that there is an optimum solids content for the mycelial fungal mass so as to produce the desired texture simulating meat and this optimum solids content is found to be preferably between 23% and 33% by weight, although within the range of from about 20% to 40% by weight gives a worthwhile product. Mycelial fungal mass with a solids content below 20% is too slack to texturize whereas a mass with a solids content significantly above 40% becomes too stiff to work. The starting mycelial fungal mass consists essentially of fungal mycelia and moisture. As used herein "consists essentially of" and "consisting essentially of" mean that the mass does not contain measurable amounts of other protein material, such as flour, plant protein, animal protein and the like but can have small amounts of materials added to enhance the appeal of the product, such as flavors, essences, binders and colorants.

The method of the invention is carried out at ambient temperature. The aforesaid mycelial fungal mass is rolled between two mutually moving surfaces to form an elongate cylinder 10 of FIG. 1. In accordance with the invention, the mass 8 (FIG. 7) is elongated to such an extent so that its final length is at least 15 to 30 times its initial length. It appears from microphotographs that this produces a high degree of attenuation of the groups of hyphae. Next at least two sections of the cylinder are juxtaposed to form a tiered mass. To accomplish this step the cylinder can be manipulated in many different ways, four of which are illustrated, by way of example, in FIGS. 2 to 5. In FIG. 2, the cylinder 10 is simply folded so that one end 11 lies on top of the other end 12 and, therefore, the two halves of the cylinder 10 are juxtaposed. In this example the cylinder 10 is manipulated into two tiers there being eight rolling steps in all. The tiered mass is then re-rolled to form a further cylinder 10. This procedure is repeated several times until the desired layered and textured nature of the product is obtained.

Various other forms of manipulation are possible, for example, in that as shown in FIG. 3, the two ends 11 and 12 of the cylinder 10 are folded to the center of the cylinder to form a two tiered mass. In FIG. 4 the end 11 is folded to a position two thirds of the way down the cylinder towards the end 12 and then the end 12 folded to the new other end of the mass. In this instance, the cylinder is formed into a three tiered mass there being five rolling steps in all. As shown in FIG. 5, the cylinder 10 may be severed in two places to form three equal lengths 13, 14 and 15 which are then tiered.

In each case, the tiering takes place after elongation and the procedure repeated a sufficient number of times to form a desired layered and textured structure.

The FIGS. 6 to 10 inclusive are diagrammatic and are included in an effort to show the structuring of the mass 8. For this purpose, one half of the mass 8 was treated with a coloring dye and in FIG. 6 this portion 16 is shown shaded.

Figure 7:
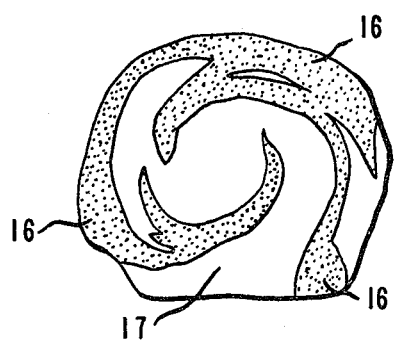
FIG. 7 is a lateral cross-sectional view through the cylinder of FIG. 1 starting from the mass of FIG. 6 after two rolling steps.
Figure 8:
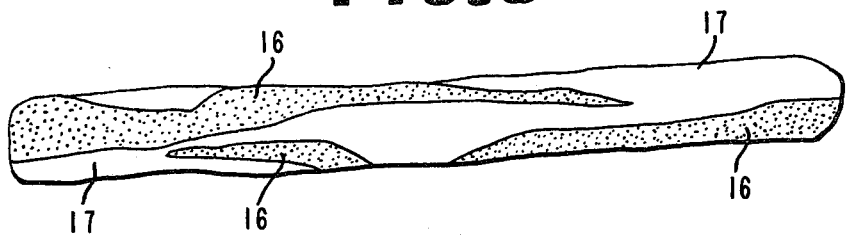
FIG. 8 is a side view of the cylinder of FIG. 7.

The method was carried out in accordance with the procedure illustrated in FIG. 2, i.e. the cylinder formed by rolling was folded in half to form a two tiered structure and after two rollings with one folding between them the structuring of FIGS. 7 and 8 was achieved. It will be noticed that the shaded portion, i.e. the lower portion 16 of the original mass 8 indicates that the cross-section of the mass is beginning to spiral.

It is significant to note that because the starting material is anisotropic, if similar lateral cross-sections had been taken at other points along the length of the cylinder, then a similar general appearance of a spiral shape would be present but the precise nature of the spiral would be different from that illustrated in FIG. 7. In this connection it will be seen from FIG. 8 that the shaded and unshaded portions at the surface of the cylinder are not consistent along the length of the cylinder.

Figure 9:
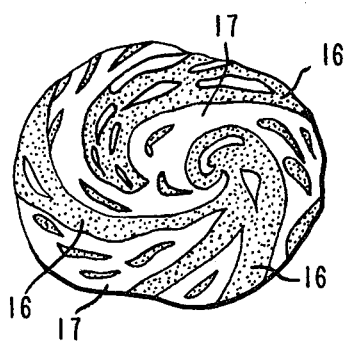
FIG. 9 is a lateral cross-sectional view through the mass of FIG. 6 after five rolling steps.
Figure 10:
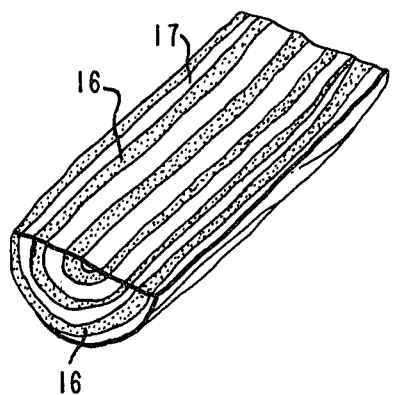
FIG. 10 is a longitudinal cross-sectional view through the cylinder of FIG. 9.

Further folding and rolling steps were carried out and FIGS. 9 and 10 illustrate the material after five rollings, with four intermediate folding steps. It will be seen in particular from FIG. 9 that the material is now very clearly in a spiral shape in the plane of the lateral cross-section of the cylinder. Again if similar lateral cross-sections were taken, the general spiral shape would be present although the exact configuration of the dyed portion 16 and the undyed portion 17 would be different from that illustrated in FIG. 9.

The rolling of the mass to elongate the same into a cylindrical form attenuates and entangles the groups of hyphae to a substantial extent. Also, due to the spiralling of the layers, planes of discontinuity are formed between adjacent filaments, these filaments being axially orientated along the length of the cylinder. Of course, the planes of discontinuity are also spirally shaped in the mass, some of these planes being the borders between the shaded and unshaded proportions of FIG. 9. As mentioned above, FIG. 9 is purely diagrammatic, and in practice the filaments would be smaller than those shown.

After having been rolled and folded several times in accordance with the present invention the product will be further processed for use as a foodstuff. The product of the present invention has a texture analogous to the texture of meat, fish or other conventional textured foodstuffs. The product of the invention is a mass consisting essentially of fungal mycelia and moisture, said mass containing from about 20%–40% of solids by weight and having a structure composed of axially attenuated and entangled groups of hyphae and axially oriented filaments with planes of discontinuity between adjacent filaments. The filaments are disposed in the plane of lateral cross section of the mass generally in the form of a spiral.

I claim:

1. A method of texturizing at ambient temperature a mass consisting essentially of fungal mycelia and moisture, said mass having reduced turgor and a solids content of from about 20% to 40% by weight, comprising solely the steps of (A) rolling the mass between two mutually moving surfaces to form an elongate cylinder, (B) juxtaposing at least two sections of the cylinder to form a tiered mass, and (C) successively repeating steps (A) and (B) and finishing with step (A) to obtain a meat-like or fish-like textured structure.

2. The method of claim 1 wherein the mass is elongated to a length at least 15 to 30 times its initial length.

3. The method of claim 1 wherein for each juxtapositioning a three-tiered mass is formed and there are five rolling steps in all.

4. The method of claim 3 wherein, to form each three-tiered mass, one end of the elongate cylinder is folded to a position two-thirds of the way down the cylinder from said one end and the other end of the cylinder is folded to the newly formed one end of the cylinder.

5. The method of claim 3 wherein, to form each three-tiered mass, the elongate cylinder is severed into three equal lengths which are then tiered.

6. The method of claim 1 wherein for each juxtapositioning a two-tiered mass is formed and there are eight rolling steps in all.

7. The method of claim 6 wherein, to form each two-tiered mass, one end of the elongate cylinder is folded to the other end of the cylinder.

8. The method of claim 6 wherein, to form each two-tiered mass, each end of the elongate cylinder is folded to the center of the cylinder.

9. A mass consisting essentially of fungal mycelia and moisture textured to be analogous to the texture of meat or fish by the method of claim 1.

* * * * *